(12) United States Patent
Pallister et al.

(10) Patent No.: US 10,644,397 B2
(45) Date of Patent: May 5, 2020

(54) METHODS, APPARATUS AND SYSTEMS FOR MOTION PREDICTIVE BEAMFORMING

(71) Applicant: Intel Corporation, Santa Clara, CA (US)

(72) Inventors: Kim Pallister, Portland, OR (US); Karthik Veeramani, Hillsboro, OR (US); Vijay Sarathi Kesavan, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 230 days.

(21) Appl. No.: 15/639,910

(22) Filed: Jun. 30, 2017

(65) Prior Publication Data

US 2019/0006754 A1 Jan. 3, 2019

(51) Int. Cl.
*H01Q 3/28* (2006.01)
*H01Q 3/24* (2006.01)
*H04B 7/06* (2006.01)
*H01Q 1/27* (2006.01)

(52) U.S. Cl.
CPC ............ *H01Q 3/28* (2013.01); *H01Q 3/24* (2013.01); *H04B 7/0617* (2013.01); *H01Q 1/276* (2013.01)

(58) Field of Classification Search
CPC .. H04B 7/0408; H04B 7/0617; H04B 7/0619; H01Q 3/24; H01Q 3/28; H01Q 3/30; H01Q 3/2605; H01Q 3/2685; H01Q 1/276; H01Q 25/002; H01Q 5/28
USPC .......................................................... 342/377
See application file for complete search history.

(56) References Cited

U.S. PATENT DOCUMENTS

| 9,432,768 | B1 * | 8/2016 | O'Neill ................. H04R 3/005 |
| 9,523,767 | B2 * | 12/2016 | Rofougaran .......... A63F 13/235 |
| 9,941,945 | B2 * | 4/2018 | Kim ..................... H04B 7/0421 |
| 10,209,771 | B2 * | 2/2019 | Tokubo .................. G06F 3/012 |
| 2015/0264583 | A1 * | 9/2015 | Sundstrom ............ H04W 16/28 342/373 |

* cited by examiner

*Primary Examiner* — Vladimir Magliore
*Assistant Examiner* — Michael W Justice
(74) *Attorney, Agent, or Firm* — Hanley, Flight & Zimmerman, LLC (57) ABSTRACT

Methods, apparatus and systems for motion-predictive beamforming are disclosed. A method for motion predictive beamforming includes determining a time of a predicted transmission and determining a future position of a virtual reality (VR) receiving device at the time of the predicted transmission. Beamforming parameters are forwarded wireless system that correspond to the future position of the VR receiving device, the time of the predicted transmission, and an error correction margin to cause a transmission of a beam that is formed based on the future position of the VR receiving device, the time of the predicted transmission, and the error correction margin.

26 Claims, 8 Drawing Sheets

METHODS, APPARATUS AND SYSTEMS FOR MOTION PREDICTIVE BEAMFORMING

FIELD OF THE DISCLOSURE

This disclosure relates generally to beamforming, and, more particularly, to methods apparatus and systems for motion predictive beamforming.

BACKGROUND

Beamforming technology enables the energy of a wireless transmitter to be focused in one or more specific directions to ensure a better quality of transmission in those directions. A direction in which the transmitter is focused can be programmatically changed to accommodate changes in user conditions such as movement of the receiving device. In such systems, the transmitter direction changes are based on the instructions that are provided by a programmer. The drawback of this approach is that dynamically moving receiving devices have a high likelihood of moving outside of the range specified by the programmer. Thus, the benefit of focusing the energy of the wireless transmitter in a specified direction/range is negated.

BRIEF DESCRIPTION OF THE DRAWING

The figures are not to scale. Wherever possible, the same reference numbers will be used throughout the drawing(s) and accompanying written description to refer to the same or like parts.

DETAILED DESCRIPTION

Figure 1:
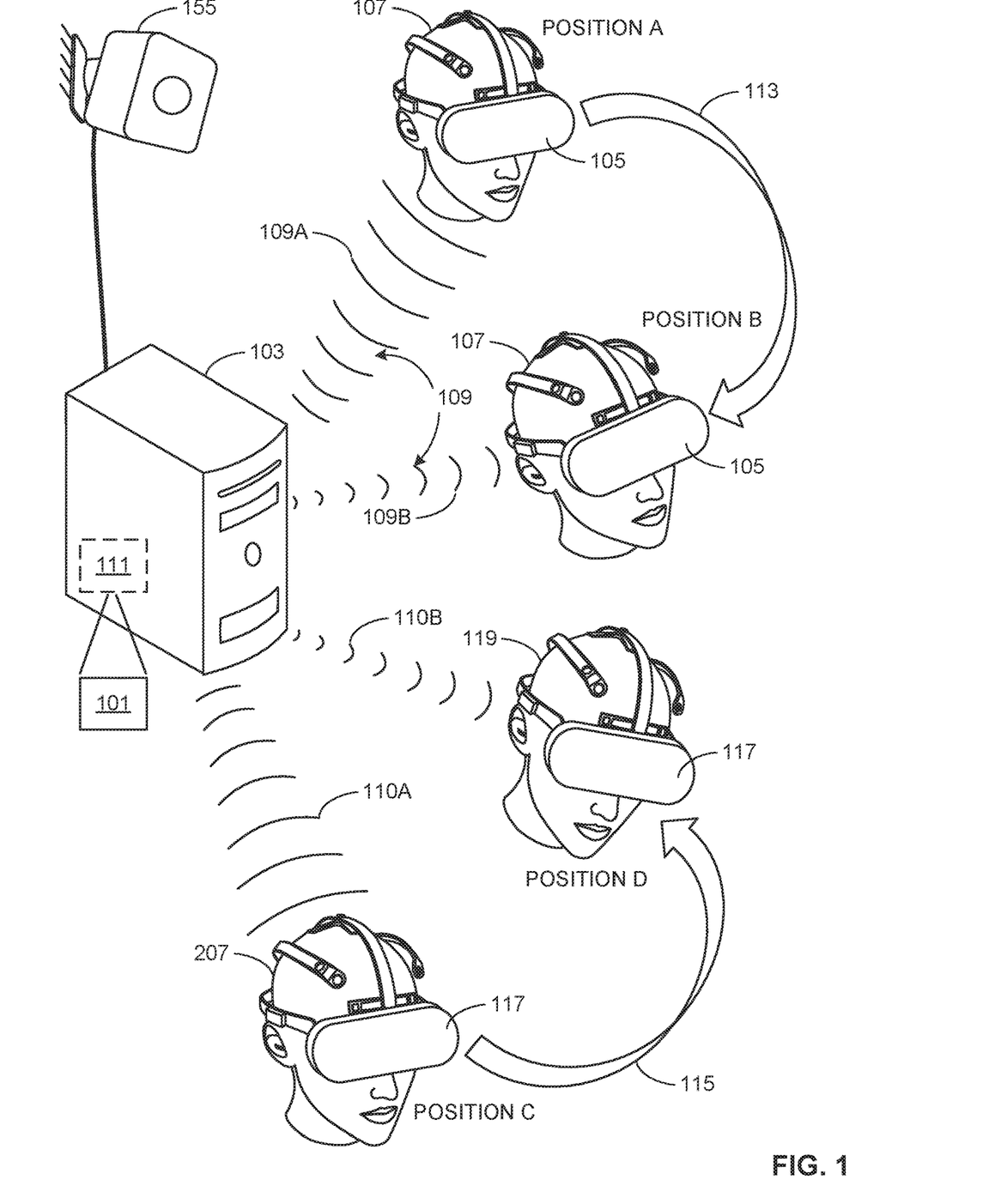
FIG. 1 is an example of a typical operating environment for a system for motion predictive beamforming.

FIG. 1 is a schematic illustration of example operating environment for a system 101 for motion predictive beamforming. System 101 controls beam formation based on a predicted position of a virtual reality (VR) receiving device. FIG. 1 shows a host computer system 103, a virtual reality (VR) receiver 105, a user 107, a beam 109, the VR system 111, the system 101, a position tracker 155, a second VR receiver 117 and a second user 119. The second VR receiver 117 and the second user 119 will be described in more detail in connection with the description of the operation of system 101.

Figure 2:
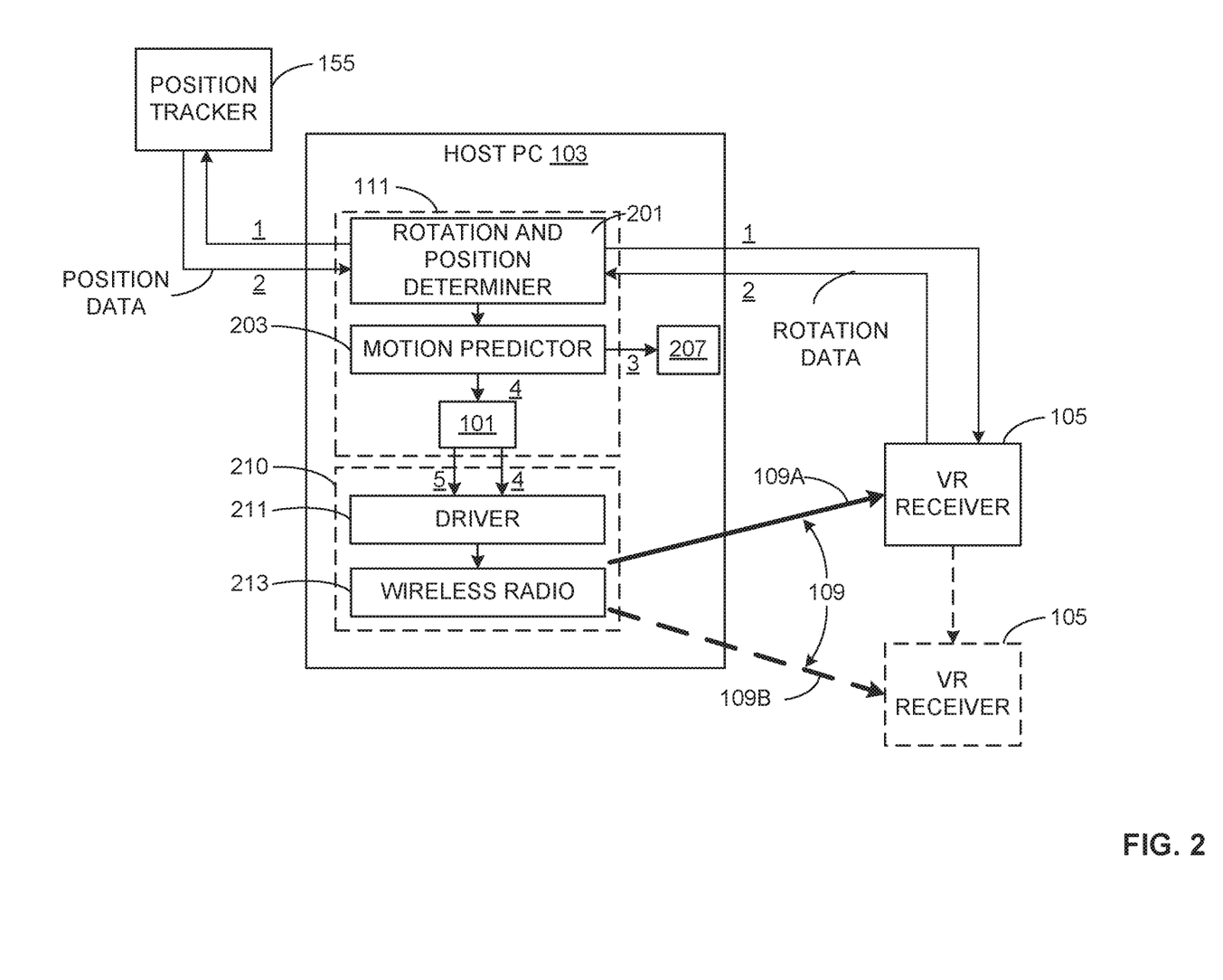
FIG. 2 shows an example virtual reality (VR) system that includes rotational and positional determination, a motion predictor and a system for motion predictive beamforming that are in communication with a wireless system.

Referring to FIG. 1, the host computer system 103 (personal computer, game console, etc.) is the installation/execution site of VR system 111 and transmits content provided by the VR system 111 to the VR receiver 105. In some examples, the VR receiver 105 is a head mounted device (HMD). In other examples, the VR receiver 105 can include other suitable virtual reality receiving devices. The VR system 111, via a wireless system (210 in FIG. 2), provides VR content (gaming, sports, travel, music, etc.) to the VR receiver 105. FIG. 2 shows example functional blocks of the VR system 111 and the wireless system 210.

Referring to FIG. 2, example functional blocks of the VR system 111 include a rotational and positional determiner 201, a motion predictor 203 and the system 101. Example functional blocks of the wireless system 210 include wireless drivers 211 and a wireless radio 213. In some examples, the rotational and positional determiner 201 and the motion predictor 203 of the VR system 111 provide a prediction of the position and/or the orientation of the VR receiver 105 (that is based on information that is provided by a positional tracker 155). In some examples, this information is generated for purposes that include but are not limited to hiding latencies that would be perceptible by the user 107 (FIG. 1) in the absence of the use of such predictive information to improve transmission quality. In this manner, the movements of the user 107 of the VR system 111 are predicted such that the wireless system 210 can be directed by system 101 to form a beam having parameters that are specified for the delivery of content to the predicted position of the user 107.

In some examples, VR system 111 can utilize an algorithm to predict the motion of the user 107 (e.g., wearing a wireless head-mounted device such as the VR receiver 105). In one example, the system 101 accesses the motion prediction data (e.g., position tracking data) thus generated and uses it to direct the beam formation of the wireless system 210. As a part of operation, the system 101 receives the position tracking data and determines a time of a predicted transmission. Moreover, the system 101 determines a future position of a VR receiver (e.g., an HMD) at the time of the predicted transmission, based on the position tracking data and the time of predicted transmission. Thereafter, the system 101 causes the transmission of a beam that has a direction, energy and time that is based on the determination of the future position of the receiver at the time of the predicted transmission. In one example, the system 101 causes the transmitting of a beam that has the predicted direction, energy and time by determining these parameters and providing them to the wireless system 210. The wireless system 210 then transmits a beam that is formed to have the specified parameters. FIG. 1 provides an illustrated example of the transmission of a beam based on the future position of the VR receiver 105. As shown in FIG. 1, in some examples, when a user 107 moves 113 from position A to position B, the beam 109 is redirected in concert with the move, in the direction of position B, based on the direction provided by the system 101. In addition, in some examples as shown in FIG. 1, the width of the beam can be formed to be more narrowly focused (corresponding to a change in beam parameters from 109A to 109B as shown in FIG. 2), based on a confidence measure of the prediction as discussed in detail herein below. Such details of the operation of system 101 are described herein below with reference to FIGS. 1-3.

In one example, the system 101 can be an integral part of the VR system 111 as shown in FIG. 1. In other examples, the system 101 can be separate from the VR system 111 but work cooperatively therewith.

As a part of determining the future position of the VR receiver 105, the system 101 determines the value of a motion prediction variable that indicates time-of-predicted transmission. In one example, this information is used to predict the future position of the VR receiver 105 at the time when the beam 109 will be ready to be transmitted. This information is in turn provided to the wireless system 210, which uses it to control the direction of the beam 109 and the amount of energy used in the beam. Additionally, the wireless system 210 can use the predicted position to dynamically adjust the radio frequency (RF) energy between main and side lobes of the antenna to rapidly switch between them and to provide a seamless switchover experience.

In addition, the system 101 maintains a running error margin, related to predictions, that is based on the motion tracking data that is obtained from the VR system 111. In one example, the running error margin is based on a comparison of the actual VR receiver position, as determined from position tracking data, to the predicted VR receiver position. This data enables the system 101 to determine the accuracy of its VR receiver position predictions. In one example, accuracy can be used as a measure of confidence upon which adjustments to the width of the beam 109, or modulation of the aggressiveness of switching energy between the main and side lobes of the beam 109, can be made. For example, the greater the confidence (e.g., the lesser the error margin), the narrower the beam can be focused, improving the range and signal strength in the beam focus direction.

In one example, the system 101 via the host computer 103 can serve multiple VR receivers at the same time (for example, for local multiplayer gaming). For example, the predicted motion for each VR receiver can be provided to the wireless system 210 with a unique identifier of the corresponding VR receiver. The unique identifier directs the wireless system 210 to use beamforming parameters (in the formation of beams for the respective VR receivers) that correspond to the respective VR receivers. Applications such as wireless virtual reality (VR) can significantly benefit from beamforming, since the benefits of beamforming such as improved signal to noise ratio (SNR) and range directly impact the usability of wireless VR. In particular, system 101 improves transmission reliability, improves quality, and reduces power requirements (and consequently battery weight). Moreover, the system 101 addresses the challenges of constantly and rapidly moving receivers which can result in loss of signal due to misguided beamforming and can have a detrimental impact on usability.

Operation

Figure 3:
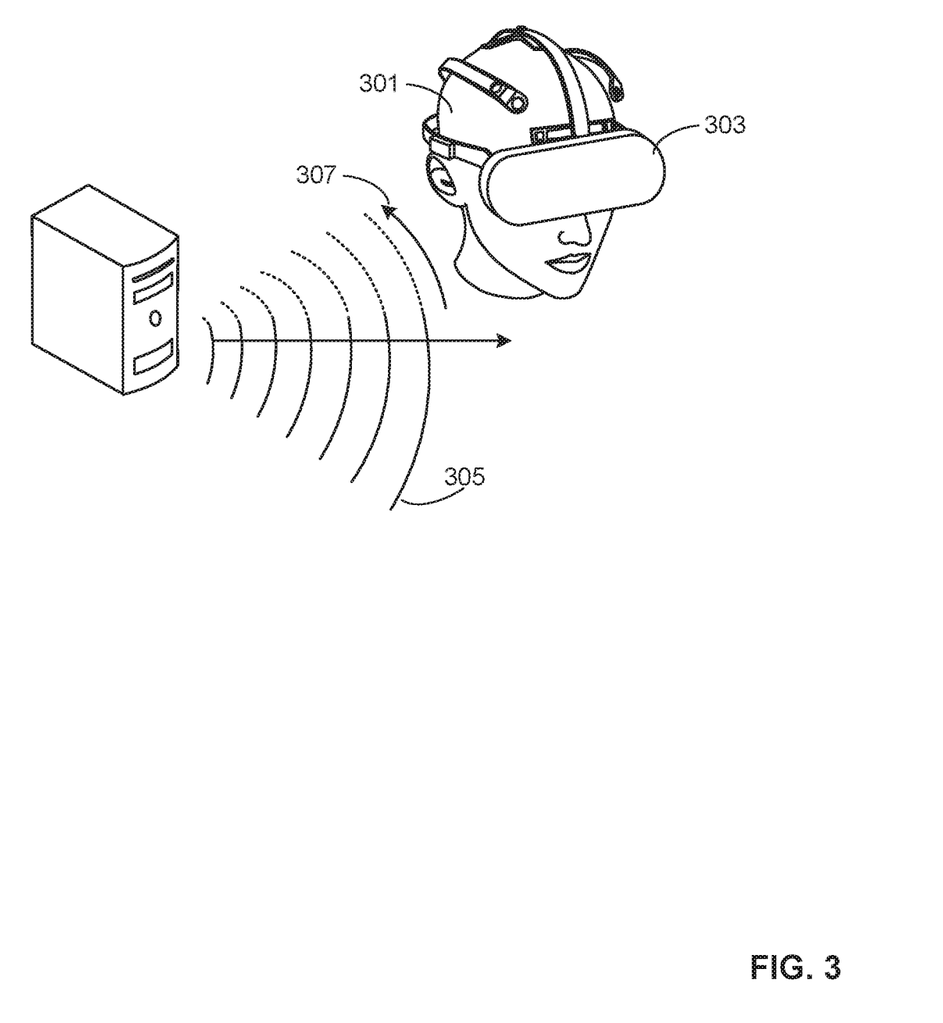
FIG. 3 illustrates an example adjustment of a beam to have a greater width based on a position of a VR receiving device away from the direction in which a transmitter is focused.

FIGS. 1-3 show example operations performed by system for motion predictive beamforming. These operations, which relate to a system for motion predictive beamforming, are only examples. It should be appreciated that other operations not illustrated in FIGS. 1-3 can be performed in accordance with some examples, or operations illustrated FIGS. 1-3 may not be performed in accordance with some examples.

Referring to FIG. 2, at 1, the VR system 111 running on the host computer is coupled wirelessly to a VR receiver 105 (e.g., a head-mounted device (HMD)) and wired/wirelessly coupled to one or more position trackers 155. In one example, position trackers 155 can include but are not limited to external cameras, inside-out tracking cameras, lighthouses or a combination of these.

At 2, VR receiver 105 sends head rotation information to host computer system 103 (FIG. 1). In addition, position tracker 155 sends position tracking information to the host computer system (e.g., host computer system 103 in FIG. 1). Motion predictor 203, receives this data and uses it to predict the user's physical position and rotation in the next interval of time. In some examples, motion predictor 203 can use any suitable motion predicting algorithm that can provide predictions at a suitable frequency. An example flow of 2 is as follows:

a. Sample position at time T0
b. Predicted_pos_at_t1_for_beam_refocus=fPredictor (T0, expected_latency_of_beam_refocus)
c. Predicted_pos_at_t1_for_VR_usage=fPredictor(T0, expected_latency_of_graphics_subsystem)

In some examples, the above prediction function includes an input for beam refocusing which can be provided in addition to typical VR operations (e.g., timewarp or other application that processes a rendered image to correct for head movement). In other examples, other prediction functions can be used. At 3, the predicted motion data generated by motion predictor 203 is provided to a VR application 207 (such as a game) and used as a basis for its next frame. In one example, this information is additionally provided to the wireless system 210 (see 4 below), possibly with some transformations that are more applicable to the wireless domain. For example, a quaternion rotational representation of the predicted position data can be converted into a spherical coordinate representation (r, θ, Φ) that is typical of wireless systems.

At 4, the system 101 receives the predicted motion data and provides it (after processing described herein with reference to FIGS. 4-7) to the wireless driver 211, which generates instructions that are provided to the wireless transmitter hardware. In one example, the instructions instruct the wireless transmitter hardware to re-position its beam in the predicted direction of the user/VR receiver. In some examples, this is done by manipulating the feed current of a transmission phased array antenna (an antenna which creates a beam that can be directed to point in different directions) by a phase shifter component to control the azimuth and angle of the beam. This allows better signal strength as the user moves, preventing a loss of immersion in the VR world. Additionally, in one example, based on the predicted position, radio frequency (RF) energy in side lobes of a transmitted beam can be dynamically adjusted. For example, the wireless system 210 can determine that the predicted position requires concentrating more energy into one or more particular side lobes. In such examples, a side lobe can be used as a main lobe.

At 5, the system 101, for example, via the wireless driver 211 transmits an error margin with the predicted motion data to the wireless system 210. In one example, this enables the wireless driver 211 to instruct the wireless system 210, hardware, to make adjustments, e.g., spread its beam over a wider range, or control the aggressiveness of switching energy between lobes, in case the user does not end up in the predicted position.

In one example, a video frame can be transmitted once every 11 milliseconds. In other examples, video frame transmissions can have other frame rates. In one example, if the wireless subsystem is expected to complete redirecting a beam before a given time period, e.g., prior to an $11^{th}$ future millisecond, but does not, the video frame transmitted during that time period can suffer in quality. However, in one example, because the wireless subsystem may know of a user's predicted position at the $22^{nd}$ future millisecond (next time period), it can either stop or quickly complete a current task(s), and then immediately undertake to complete a redirecting of the beam in a timely manner before the start of that time period. In this way the transmission of the video frame to the position of the VR receiver 105 at the proper time is ensured. In some examples, a way of correcting beam directing/redirecting errors can involve the motion predictor communicating a list of future positions, as opposed to the very next position. In such examples, the motion predictor can compute and have forwarded to the wireless system information (such as via operation of beamformer 407 in FIG. 4) that indicates where the user will be at the start of multiple future time periods, e.g., 11, 22, 33, 44 milliseconds in the future. If the wireless system attempts to complete redirection of the beam by the $11^{th}$ millisecond, but fails, e.g., because of a transient problem, instead of trying to complete the redirection by the next time period, it can redirect the beam to the computed $33^{rd}$ millisecond position (two time periods ahead). In this manner, although the $22^{nd}$ millisecond video frame may not be transmitted with maximal quality, the extra time can be used to stabilize transmission in time for the subsequent video frame.

In the above example, the timing described (e.g., periods beginning 11, 22, 33, 44 milliseconds in the future) is exemplary of a 11 ms frame interval or 90 Hz frequency. In other examples, where other frame rates and frequencies are employed the future time periods would correspond to the utilized frame rate and frequency.

FIG. 3 illustrates an example adjustment to spread a beam 305 over a wider range responsive to an error margin that is higher than a determined value or range of values. For example, the width of the beam 305 can be widened by an amount 307 necessary to transmit content adequately to a user 301 wearing VR receiver 303 where the user does not end up in the predicted position. Alternately, in situations where the error margin is lower than a determined value, or range of values the beam can be focused to have a narrower width (see adjustment made in FIG. 1).

Referring to FIG. 1, in some examples, an additional user 119 of the VR system (VR system 111 in FIG. 1) wearing a head mounted VR receiver 117 can be accommodated. As shown in the FIG. 1, a single host computer system 103 can simultaneously serve the two VR receivers (e.g., to co-experience a VR world or for multiplayer gaming). In some examples, when there are multiple VR receivers (e.g., two or more), the VR system 111 can provide predictions for each VR receiver to the wireless system (wireless system 210 in FIG. 2). The predictions can be provided along with a unique identifier of the VR receiver. For example, the system 101 can access prediction information that corresponds to respective VR receivers and provide that information along with a unique identifier to the wireless system 210 via the wireless driver 211. This enables the wireless driver 211 to utilize individualized beamforming parameters for each VR receiver. As shown in FIG. 1, a single host is able to make adjustments for each of the VR receivers that it serves.

Figure 4:
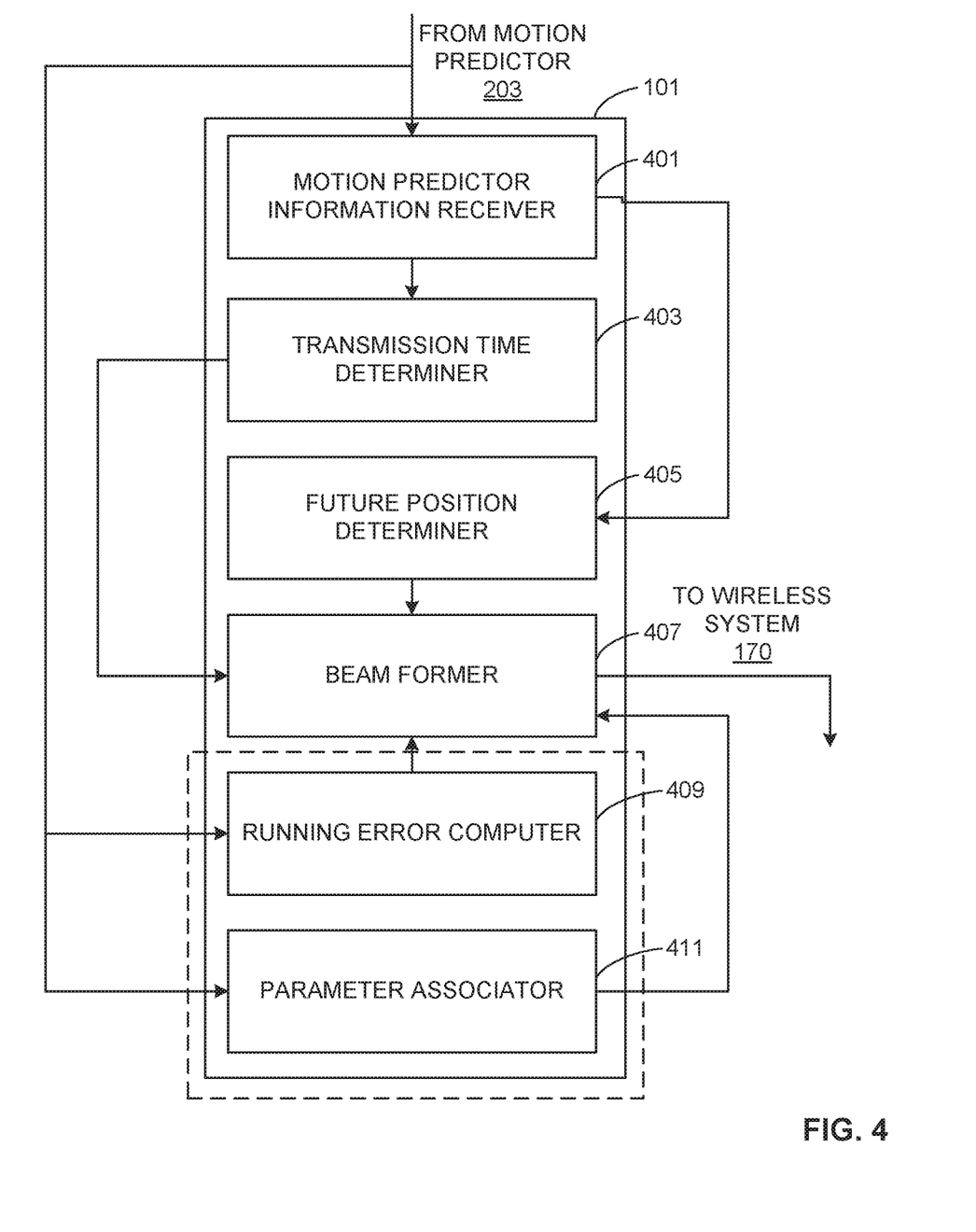
FIG. 4 shows an example system for motion predictive beamforming.

FIG. 4 shows example components of a system 101 system for motion predictive beamforming. In some examples, components of system 101 for motion predictive beamforming implement an algorithm for motion predictive beamforming. Components of system 101 shown in FIG. 4 include motion predictor information receiver 401, transmission time determiner 403, future position determiner 405, beam former 407, running error computer 409 and parameter associator 411.

Motion predictor information receiver 401 receives information from the motion predictor (203 in FIG. 2) that includes but is not limited to time of predicted transmission and future position data. In some examples, such information is based on the movement of one or more VR receivers. The movement of a VR receiver corresponds to movement by the user of the VR receiver. Position tracking data is sent from the VR receiver back to the host computer. Position tracking data is used along with time of predicted transmission to determine how a beam is directed and focused.

Transmission time determiner 403 determines a time of a predicted transmission from motion predictor information. The time of a predicted transmission indicates the time at which the wireless system (210 in FIG. 2) will transmit in a particular direction (e.g., toward the predicted location of the VR receiver). In other examples, other suitable manners of determining the time of a predicted transmission can be used. The data received predicts the user's physical position and rotation in the next interval of time. The transmission time determiner 403 determines the time of predicted transmission based on the interval of time that is associated with the prediction of the user's physical position and rotation.

Future position determiner 405 determines a future position of a VR receiver at the time of predicted transmission based on the motion predictor information that is received from the motion predictor (e.g., motion predictor 203 in FIG. 2) via the motion predictor information receiver 401. In other examples, other suitable manners of determining the future position of a VR receiver can be used. The future position determiner 405 determines the user's physical position and rotation in the next interval of time.

Beam former 407 causes the generation of a transmission having a direction, energy and time that is based on the determination of the future position of the receiver at the time of predicted transmission. For example, beam former 407 provides the predicted position and time of transmission to the wireless system in a manner that instructs the wireless transmitter hardware how to position/re-position its beam in the predicted direction of the user. In some examples, the data is provided to the wireless system with some transformations that are applicable to the wireless domain. For example, a quaternion rotational representation of predicted position data can be converted into a spherical coordinate representation that can be used by wireless systems. In some examples, the positioning/re-positioning of the beam in the predicted direction of the user can be done by adjusting/manipulating the feed current of the TX phase array antenna, based on the predicted position and time of transmission data. In some examples, the adjusting/manipulating of the feed current is performed by the phase shifter component and controls the azimuth and angle of the beam (and time of transmission of the beam). In some examples, beam former 407 provides individualized beamforming parameters (predicted position and time of transmission data that is associated with a specific VR receiver) to the wireless system (e.g., wireless system 210 in FIG. 2) for VR receivers. The wireless system forms beams in accordance with the parameters.

In one example, a video frame can be directed by beam former 407 to be transmitted once every 11 milliseconds. In other examples, video frame transmissions can have other frame rates. In one example, if the wireless subsystem is expected to complete redirecting a beam before a given time period, e.g., prior to an $11^{th}$ future millisecond, but does not, the video frame transmitted during that time period can suffer in quality. However, in one example, beam former 407 can provide the wireless subsystem a user's predicted position at the $22^{nd}$ future millisecond (next time period), and direct it to either stop or quickly complete a current task(s), and to immediately undertake to complete a redirecting of the beam in a timely manner before the start of that time period. In this way the transmission of the video frame to the position of the VR receiver 105 (FIG. 1) at the proper time is ensured. In some examples, a way of correcting beam directing/redirecting errors can involve the motion predictor (e.g., via beam form 407) communicating a list of future positions, as opposed to the very next position. In such examples, the motion predictor can compute and have forwarded (e.g., via beam former 407) to the wireless system information that indicates where the user will be at the start of multiple future time periods, e.g., 11, 22, 33, 44 milliseconds in the future. If the wireless system attempts to complete redirection of the beam by the $11^{th}$ millisecond, but fails, e.g., because of a transient problem, instead of trying to complete the redirection by the next time period, it can redirect the beam to the computed $33^{rd}$ millisecond position (two time periods ahead). In this manner, although the $22^{nd}$ millisecond video frame may not be transmitted with maximal quality, the extra time can be used to stabilize transmission in time for the subsequent video frame.

Running error computer 409 computes a running error margin. In some examples, the running error margin is a continuous measure of the margin of difference between the tracked VR receiver position and the predicted VR receiver position. In some examples, running error computer 409 receives this information from the motion predictor (e.g., 203 in FIG. 2). In some examples, this computation can be provided to the wireless system and used as a measure of the confidence with which a beam can be adjusted. For example, the manner in which the beam width is adjusted and/or the manner in which the aggressiveness of switching energy between main and side lobes of the beam is modulated. In one example, the higher the measure of confidence the narrower the width of the beam can be set. Such narrowing improves signal strength in the direction of the beam. Conversely, the lower the measure of confidence the wider the width of the beam will be set. Such widening reduces signal strength in the direction of the beam (see FIGS. 5 and 6 and accompanying description).

Parameter associator 411 causes the association of beamforming parameters with VR receivers. In some examples, the parameter associator 411 receives data from the motion predictor (e.g., 203 in FIG. 2) of the virtual reality system that is used to associate the beamforming parameters with the VR receivers. For example, parameter associator 411 can access a unique identifier of a VR receiver from the motion predictor that is used to associate beamforming parameters with individual VR receivers (see FIGS. 5 and 7 and accompanying description). In some examples, in this manner, the predicted motion corresponding to each VR receiver can be provided to the wireless subsystem, based on the unique identifier of the VR receiver, or in association with the unique identifier of the VR receiver. This enables the wireless subsystem to form beams having characteristics that are tailored for each VR receiver position. In some examples, running error computer 409 and parameter associator 411 can be separate from beam former 407 (shown in dashed line in FIG. 4). In some examples, running error computer 409 and parameter associator 411 can be an integral part of beam former 407.

While an example manner of implementing the system for motion predictive beamforming of FIG. 1 is illustrated in FIG. 4, one or more of the elements, processes and/or devices illustrated in FIG. 4 may be combined, divided, re-arranged, omitted, eliminated and/or implemented in any other way. Further, the example motion predictor information receiver 401, transmission time determiner 403, future position determiner 405, beam former 407, running error computer 409 and parameter associator 411, more generally, the example system for motion predictive beamforming of FIG. 4 may be implemented by hardware, software, firmware and/or any combination of hardware, software and/or firmware. Thus, for example, any of the example motion predictor information receiver 401, transmission time determiner 403, future position determiner 405, beam former 407, running error computer 409 and parameter associator 411, and more generally, the example system for motion predictive beamforming could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, motion predictor information receiver 401, transmission time determiner 403, future position determiner 405, beam former 407, running error computer 409 and parameter associator 411 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system for motion predictive beamforming of FIG. 4 may include one or more elements, processes and/or devices in addition to, or instead of, those illustrated in FIG. 4, and/or may include more than one of any or all of the illustrated elements, processes and devices.

Figure 5:
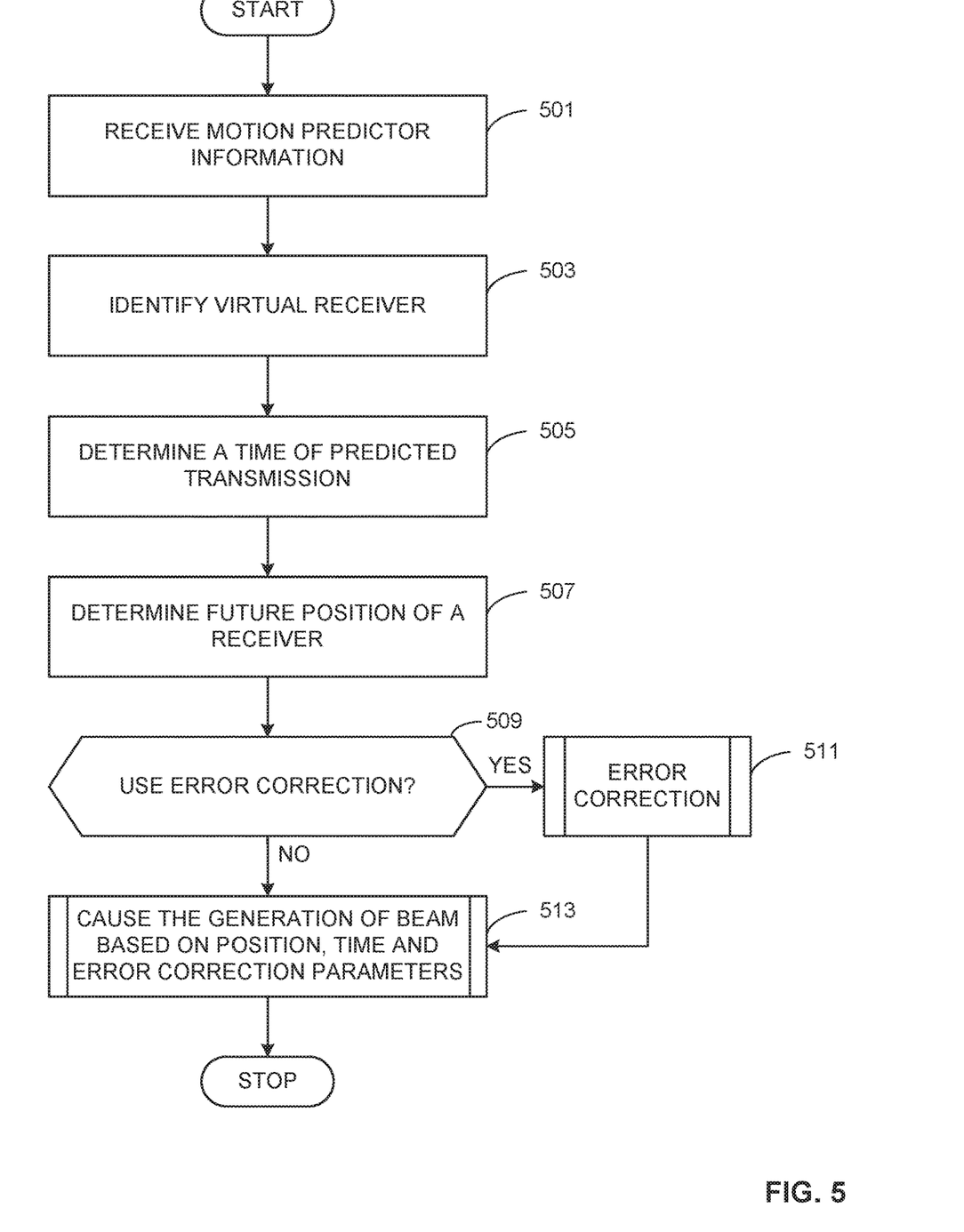
FIG. 5 shows a flowchart representative of example machine readable instructions for implementing the apparatus of FIG. 4.
Figure 6:
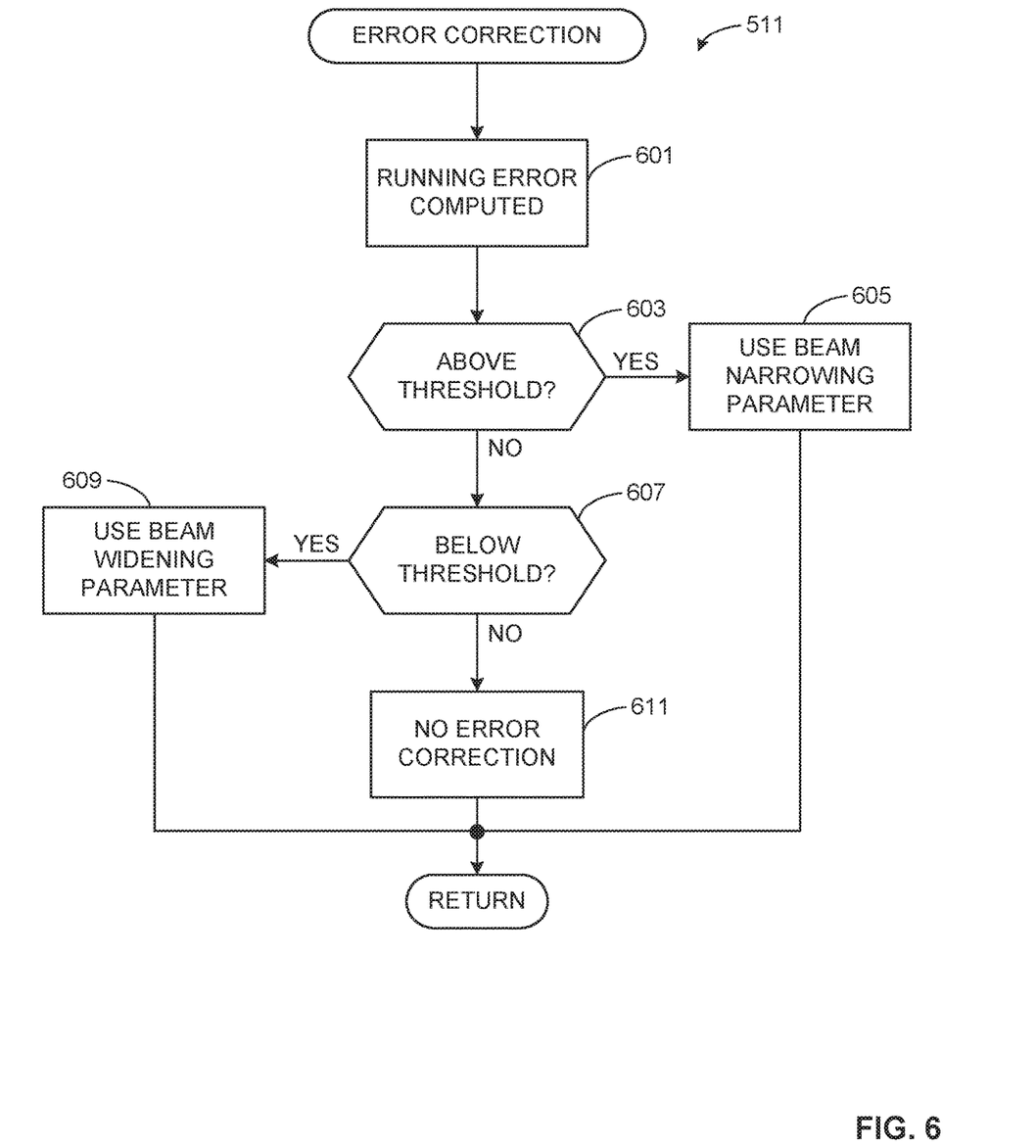
FIG. 6 shows a flowchart representative of example machine readable instructions for implementing the apparatus of FIG. 4.
Figure 7:
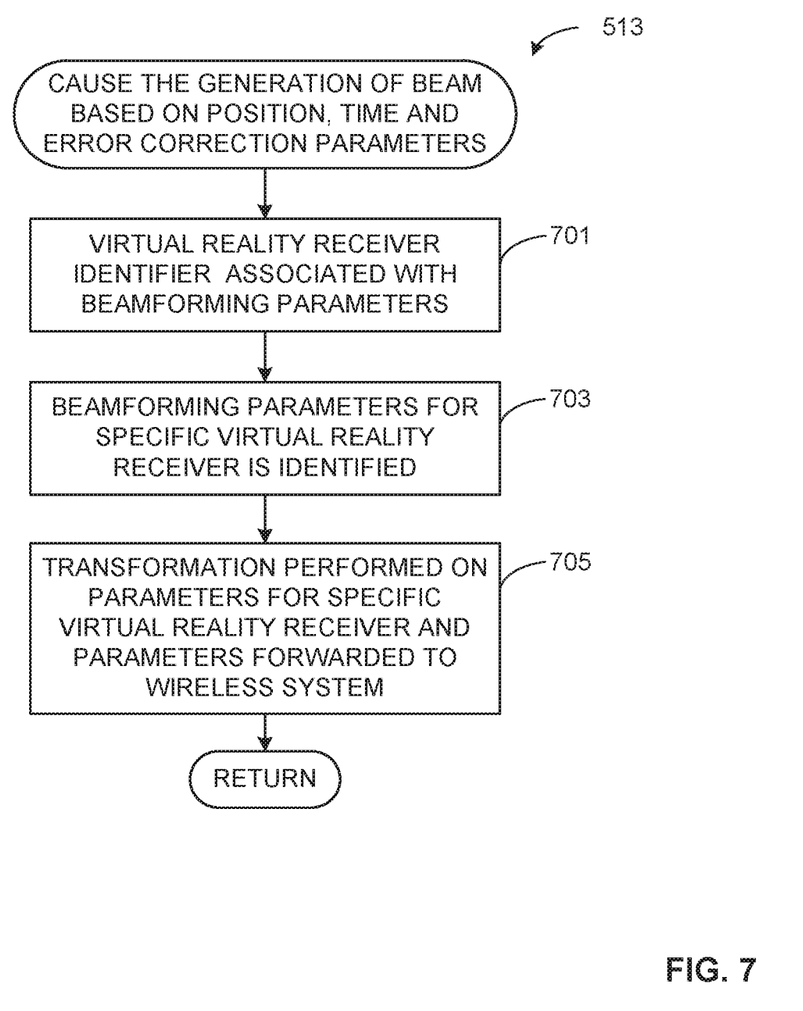
FIG. 7 shows a flowchart representative of example machine readable instructions for implementing the apparatus of FIG. 4.

Flowcharts representative of example machine readable instructions for implementing the apparatus 101 of FIG. 4 (e.g., system 101 of FIG. 1) are shown in FIGS. 5, 6, and 7. In this example, the machine readable instructions comprise a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5, 6, and 7, many other methods of implementing the example apparatus (system 101 of FIG. 1) may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Referring to FIG. 5, motion predictor information receiver 401 receives information from the motion predictor that includes time of predicted transmission, and future position data that tracks the movement of one or more VR receiver (block 501). The movement of the VR receiver corresponds to movement by the user of the VR receiver. The position tracking data is sent from the VR receiver back to the host computer. Position tracking data is used along with time of predicted transmission to determine how a beam is directed and focused.

Parameter associator 411 identifies a unique identifier of the VR receiver from the motion predictor (block 503). In some examples, the unique identifier can be accessed directly from the motion predictor. In other examples, the unique identifier can be accessed from motion predictor information that is accessed by motion predictor information receiver 401.

Transmission time determiner 403 determines a time of a predicted transmission (block 505). The time of a predicted transmission indicates the time at which the wireless system (wireless system 210 in FIG. 2) will transmit to a particular place (e.g., the predicted location of the VR receiver). In some examples, transmission time determiner 403 determines a time of a predicted transmission from motion predictor information that is accessed from motion predictor information receiver 401.

Future position determiner 405 determines a future position of a VR receiver at the time of predicted transmission (block 507). In some examples, future position determiner 403 determines a time of a predicted transmission from motion predictor information that is accessed from motion predictor information receiver 401.

Running error computer 409 determines whether to use error correction on a beam that is to be transmitted to a VR receiver (block 509). In one example, running error computer 409 can determine that error correction is not to be used if insufficient error correction information is available (for example when no or insufficient historical future position and/or time of predicted transmission data has been generated and is available) and/or the computed error is within a range that is considered acceptable. In some examples, running error computer 409 can determine that error correction will be used if sufficient running error data is available and/or the computed error is not within a range that is considered to be acceptable. In some examples, if running error computer 409 determines that error correction is to be used control passes to block 511 where error correction is performed. If running error computer determines that error correction will not be used control passes to block 513.

Running error computer 409 determines the error correction to be applied to a beam (block 511). In one example, running error computer 409 can determine whether a beam narrowing correction, a beam widening correction or no error correction is provided to beam former 407.

Beam former 407 causes the generation of a beam that is formed based on future position, time of predicted transmission and error correction parameters determined from blocks 503, 505, 507, 509 and 511 (block 513). In some examples, beam former 407 causes the generation of a beam by supplying these parameters to the wireless system. FIG. 6 is a flowchart of block 511 of FIG. 5.

Referring to FIG. 6, running error computer 409 determines a running error margin between the tracked and the predicted positions of a VR receiver of a user of the virtual reality system (block 601). In some examples, the running error margin is a continuous measure of the margin of difference between the tracked position and the predicted (future) position of the VR receiver. In some examples, this computation can be used as a measure of the confidence with which a beam can be adjusted. For example, how the beam width is adjusted and/or how the aggressiveness of switching energy between main and side lobes of the beam is modulated. In some examples, the higher the measure of confidence the narrower the width of the beam can be set. Such narrowing improves signal strength in the direction of the beam. Conversely, in some examples, the lower the measure of confidence the wider the width of the beam will be set. Such widening reduces signal strength in the direction of the beam.

Running error computer 409 determines if the running error indicates a success rate that is above a first threshold (block 603). For example, a success rate of 85 percent (running error margin of 15 percent). In some examples any suitable threshold can be used. If the success rate is above the first threshold, control passes to block 605. In particular, running error computer 409 prompts beam former 407 to forward a beam narrowing correction parameter to the wireless system (block 605). In addition, running error computer 409 can determine if the success rate is less than a second threshold (block 607). For example, a success rate of 65 percent (running error margin of 35 percent). In some examples any suitable second threshold can be used. If the success rate is below the second threshold control passes to block 609. In particular, running error computer 409 prompts beam former 407 to forward a beam widening correction parameter to the wireless subsystem (block 609). If the success rate is lower than the first threshold of block 603 and higher than the second threshold of block 607 then a beam forming parameter that indicates no error correction is provided by running error computer is transmitted to beam former 407 (block 611).

FIG. 7 is a flowchart of block 513 of FIG. 5. Referring to FIG. 7, parameter associator 411 associates VR receiver identifiers (IDs) with corresponding beam parameters (block 701). In some examples, a VR receiver ID is associated with beamforming parameters that include but are not limited to future position of the VR device, time of predicted transmission data, and beam widening/narrowing correction data (error correction margin). As used herein, future position of the VR device, time of predicted transmission data, and beam widening/narrowing correction data is termed beamforming parameters.

Beam former 407 identifies beamforming parameters associated with a specific VR receiver for forwarding to the wireless system (block 703). In some examples, beam former 407 identifies the beam forming parameters to be forwarded based on the user ID that is associated with the beam forming parameters.

Beam former 407 performs a transformation on the beamforming parameters that are identified for a specific VR receiver and the beamforming parameters are forwarded to the wireless system. The beam forming parameters are forwarded to the wireless system for use in forming the beam that is transmitted to the specific VR receiver.

Beam former 407 performs the transformation on the future position, time of predicted transmission, and beam widening/narrowing data to make the data suitable for use in the wireless domain (block 705). For example, a quaternion rotational representation of predicted position data (e.g., the future position data) can be converted into a spherical coordinate representation that can be used by wireless systems. In other examples, other transformations that make the beamforming parameters suitable for use in the wireless domain can be performed by beam former 407.

Beam former 407 provides the transformed beam forming parameters to the wireless system (block 705). In this manner, the wireless transmitter is instructed how to position/re-position its beam in the predicted direction of the VR receiver (e.g., VR receiver user). In some examples, the positioning/re-positioning of the beam in the predicted direction of the VR receiver can be done by adjusting/manipulating the feed current of a phase array antenna of the wireless system by a phase shifter component, based on the predicted (future) position and time of predicted transmission data. In some examples, the adjusting/manipulating of the feed current controls the azimuth and angle of the beam (and time of transmission of the beam).

In one example, the running error margin is a measure of the tracked position as compared to the predicted position. In one example, this computation can be used as a measure of the confidence with which a beam can be adjusted. For example, how the beam width is adjusted and/or how the aggressiveness of switching energy between main and side lobes of the beam is modulated. In some examples, the higher the measure of confidence the narrower the width of the beam can be set. Such narrowing improves signal strength in the direction of the beam. Conversely, in some examples, the lower the measure of confidence the wider the width of the beam will be set. Such widening reduces signal strength in the direction of the beam.

Figure 8:
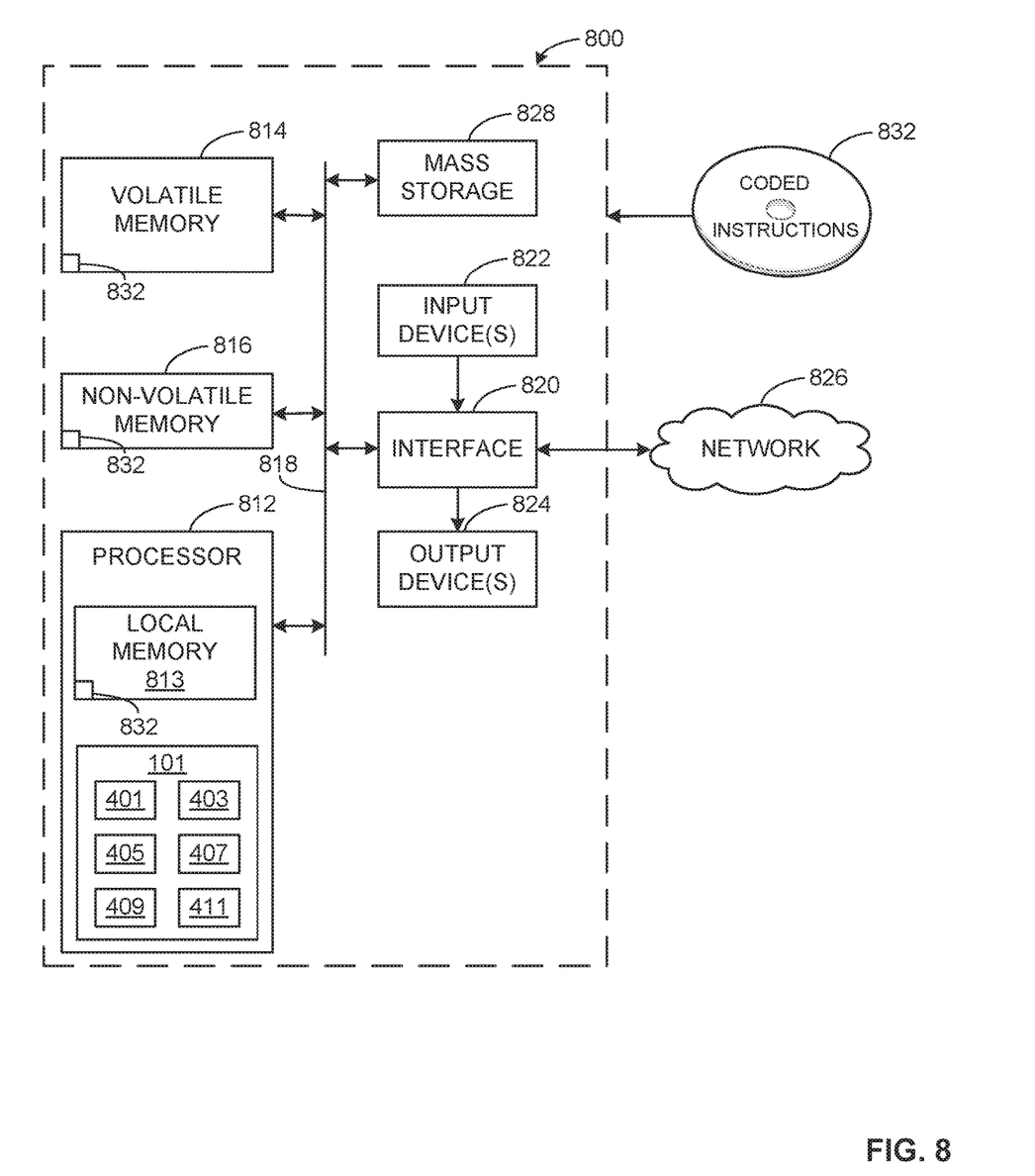
FIG. 8 shows an example processor platform that executes machine readable instructions.

FIG. 8 is a block diagram of an example processor platform 600 capable of executing the instructions of FIGS. 5, 6 and 7 to implement the apparatus of FIG. 4. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device.

The processor 812 of the illustrated example includes a local memory 613 (e.g., a cache). The processor 612 of the illustrated example is in communication with a main memory including a volatile memory 814 and a non-volatile memory 816 via a bus 818. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 8 may be stored in the mass storage device 828, in the volatile memory 8614, in the non-volatile memory 816, and/or on a removable tangible computer readable storage medium such as a CD or DVD.

Example 1 is an apparatus to perform motion-predictive beamforming, comprising, a transmission time determiner to determine a time of a predicted transmission, a future position determiner to determine a future position of a virtual reality (VR) receiving device at the time of the predicted transmission, and a beam former to forward beamforming parameters that correspond to the future position of the VR receiving device, the time of the predicted transmission, and an error correction margin to a wireless system to cause a transmission of a beam that is formed based on the future position of the VR receiving device, the time of the predicted transmission, and the error correction margin.

Example 2 includes an apparatus as defined in example 1, wherein radio frequency energy is adjusted between main and side lobes of the beam.

Example 3 includes an apparatus as defined in example 1, wherein a unique identifier is associated with a plurality of VR receiving devices that include the VR receiving device.

Example 4 includes an apparatus as defined in example 1, wherein motion predicting is used to determine beamforming parameters.

Example 5 includes an apparatus as defined in example 1, wherein the error correction margin is used to adjust beam width.

Example 6 includes an apparatus as defined in example 5, wherein the error correction margin and the beam width are directly related.

Example 7 includes an apparatus as defined in example 1, wherein the beam forming parameters that correspond to the future position, the time of predicted transmission, and the error correction margin are provided from a VR system.

Example 8 includes an apparatus as defined in example 1, wherein beamforming parameters are forwarded that indicate a future position of the VR receiving device that corresponds to a time period subsequent to a next time period.

Example 9 includes an apparatus as defined in example 1, wherein beamforming parameters are forwarded that indicate the future position of the VR receiving device during a plurality of future time periods.

Example 10 is method for motion-predictive beamforming, comprising, determining a time of a predicted transmission, determining a future position of a virtual reality (VR) receiving device at the time of the predicted transmission, and forwarding beamforming parameters that correspond to the future position of the VR receiving device, the time of the predicted transmission, and an error correction margin to a wireless system to cause a transmission of a beam that is formed based on the future position of the VR receiving device, the time of the predicted transmission, and the error correction margin.

Example 11 includes a method as defined in example 8, wherein radio frequency energy is adjusted between main and side lobes of the beam.

Example 12 includes a method as defined in example 8, wherein a unique identifier is associated with a plurality of VR receiving devices that include the VR receiving device.

Example 13 includes a method as defined in example 8, wherein motion predicting is used to determine beamforming parameters.

Example 14 includes a method as defined in example 11, wherein an error correction margin is used to adjust beam width.

Example 15 includes a method as defined in example 12, wherein the error correction margin and the beam width are directly related.

Example 16 includes a method as defined in example 8, wherein the beamforming parameters that correspond to the future position, the time of predicted transmission, and the error correction margin are provided from a virtual reality system.

Example 17 includes a method as defined in example 16, wherein beamforming parameters are forwarded that indicate a future position of the VR receiving device that corresponds to a time period subsequent to a next time period.

Example 18 includes a method as defined in example 16, wherein beamforming parameters are forwarded that indicate the future position of the VR receiving device during a plurality of future time periods.

Example 19 is a computer readable storage medium comprising instructions that, when executed, cause a machine to at least, determine a time of a predicted transmission, determine a future position of a virtual reality (VR) receiving device at the time of the predicted transmission, and forward beamforming parameters that correspond to the future position of the VR receiving device, the time of the predicted transmission, and an error correction margin to a wireless system to cause a transmission of a beam that is formed based on the future position of the VR receiving device, the time of the predicted transmission, and the error correction margin.

Example 20 includes a computer readable storage medium as defined in example 19, wherein radio frequency energy is adjusted between main and side lobes of the beam.

Example 21 includes a computer readable storage medium as defined in example 19, wherein a unique identifier is associated with a plurality of VR receiving devices that include the VR receiving device.

Example 22 includes a computer readable storage medium as defined in example 19, wherein motion predicting is used to determine beamforming parameters.

Example 23 includes a computer readable storage medium as defined in example 19, wherein an error correction margin is used to adjust beam width.

Example 24 includes a computer readable storage medium as defined in example 19, wherein the beamforming parameters corresponding to the future position, the time of predicted transmission, and the error correction margin are provided from a virtual reality system.

Example 25 includes a computer readable medium as defined in example 1, wherein beamforming parameters are forwarded that indicate a future position of the VR receiving device that corresponds to a time period subsequent to a next time period.

Example 26 includes a computer readable medium as defined in example 1, wherein beamforming parameters are forwarded that indicate the future position of the VR receiving device during a plurality of future time periods.

Example 27 is a system for motion-predictive beamforming, comprising, means for determining a time of a predicted transmission, means for determining a future position of a virtual reality (VR) receiving device at the time of the predicted transmission, and means for forwarding beamforming parameters that correspond to the future position of the VR receiving device, the time of the predicted transmission, and an error correction margin to a wireless system to cause a transmission of a beam that is formed based on the future position of the VR receiving device, the time of the predicted transmission, and the error correction margin.

Example 28 includes a system as defined in example 27, wherein radio frequency energy is adjusted between main and side lobes of the beam.

Example 29 includes a system as defined in example 27, wherein a unique identifier is associated with a plurality of VR receiving devices that include the VR receiving device.

Example 30 includes a system as defined in example 27, wherein motion predicting is used to determine beamforming parameters.

Example 31 includes a system as defined in example 27, wherein an error correction margin is used to adjust beam width.

Example 32 includes a system as defined in example 31, wherein the error correction margin and the beam width are directly related.

Example 33 includes a system as defined in example 27, wherein the beamforming parameters that correspond to the future position, the time of predicted transmission, and the error correction margin are provided from a virtual reality system.

Example 34 includes a system as defined in example 27, wherein beamforming parameters are forwarded that indicate a future position of the VR receiving device that corresponds to a time period subsequent to a next time period.

Example 35 includes a system as defined in example 27, wherein beamforming parameters are forwarded that indicate the future position of the VR receiving device during a plurality of future time periods.

From the foregoing, it will be appreciated that example methods, apparatus and articles of manufacture have been disclosed that include, receiving position tracking data, determining a time of a predicted transmission, and determining a future position of a virtual reality receiving device at the time of predicted transmission based on the position data and the time of predicted transmission. A beam is transmitted to include a direction, energy and time that is based on the determination of a predicted position of the virtual reality receiving device at the time of predicted transmission.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform motion-predictive beamforming, the apparatus comprising:
    a transmission time determiner to determine a time of a predicted transmission;
    a future position determiner to determine a future position of a virtual reality (VR) receiving device at the time of the predicted transmission;
    a running error computer to:
        determine whether previously-determined future position data of the VR receiving device and previously-determined tracked position data of the VR receiving device are available;
        in response to determining that the previously-determined future position data and the previously-determined tracked position data are available, determine a running error margin based on differences between the previously-determined tracked position data and the previously-determined future position data;
        determine whether the running error margin is within a threshold error margin range; and
        in response determining that the running error margin is outside the threshold error margin range, determine an error correction to be applied to a beam; and
    a beam former to forward beamforming parameters corresponding to the future position of the VR receiving device, the time of the predicted transmission, and the error correction to a wireless system to cause a transmission of a beam formed based on the future position of the VR receiving device, the time of the predicted transmission, and the error correction.

2. The apparatus of claim 1, wherein radio frequency energy is to be adjusted between main and side lobes of the beam based on the beamforming parameters.

3. The apparatus of claim 1, further including a parameter associator to:
    identify a unique identifier of the VR receiving device; and
    associate the beamforming parameters with the VR receiving device based on the unique identifier.

4. The apparatus of claim 1, wherein a width of the beam is to be adjusted based on the error correction.

5. The apparatus of claim 4, wherein the adjusted width of the beam is directly related to the error correction.

6. The apparatus of claim 1, wherein the beam former is to forward the beamforming parameters to the wireless system from a VR system.

7. The apparatus of claim 1, wherein the future position of the VR receiving device corresponds to a time period subsequent to a next time period.

8. The apparatus of claim 1, wherein the future position of the VR receiving device includes a plurality of future positions of the VR receiving device during a corresponding plurality of future time periods.

9. A method for motion-predictive beamforming, the method comprising:
    determining a time of a predicted transmission;
    determining a future position of a virtual reality (VR) receiving device at the time of the predicted transmission;
    determining whether previously-determined future position data of the VR receiving device and previously-determined tracked position data of the VR receiving device are available;
    in response to determining that the previously-determined future position data and the previously-determined tracked position data are available, determining a running error margin based on differences between the previously-determined tracked position data and the previously-determined future position data
    determining whether the running error margin is within a threshold error margin range;
    in response to determining that the running error margin is outside the threshold error margin range, determining an error correction to be applied to a beam; and
    forwarding beamforming parameters corresponding to the future position of the VR receiving device, the time of the predicted transmission, and the error correction to a wireless system to cause a transmission of a beam that is formed based on the future position of the VR receiving device, the time of the predicted transmission, and the error correction.

10. The method of claim 9, further including adjusting radio frequency energy between main and side lobes of the beam based on the beamforming parameters.

11. The method of claim 9, further including:
    identifying a unique identifier of the VR receiving device; and
    associating the beamforming parameters with the VR receiving device based on the unique identifier.

12. The method of claim 9, further including adjusting a width of the beam based on the error correction.

13. The method of claim 12, wherein the adjusted width of the beam is directly related to the error correction.

14. The method of claim 9, wherein the forwarding of the beamforming parameters includes forwarding the beamforming parameters to the wireless system from a VR system.

15. The method of claim 9, wherein the future position of the VR receiving device corresponds to a time period subsequent to a next time period.

16. The method of claim 9, wherein the future position of the VR receiving device includes a plurality of future positions of the VR receiving device during a corresponding plurality of future time periods.

17. A non-transitory computer readable storage medium comprising instructions that, when executed, cause a machine to at least:
    determine a time of a predicted transmission;

determine a future position of a virtual reality (VR) receiving device at the time of the predicted transmission;

determine whether previously-determined future position data of the VR receiving device and previously-determined tracked position data of the VR receiving device are available;

in response to determining that the previously-determined future position data and the previously-determined tracked position data are available, determine a running error margin based on differences between the previously-determined tracked position data and the previously-determined future position data determine whether the running error margin is within a threshold error margin range;

in response to determining that the running error margin is outside the threshold error margin range, determine an error correction to be applied to a beam; and forward beamforming parameters corresponding to the future position of the VR receiving device, the time of the predicted transmission, and the error correction margin to a wireless system to cause a transmission of a beam formed based on the future position of the VR receiving device, the time of the predicted transmission, and the error correction.

18. The non-transitory computer readable storage medium of claim 17, wherein radio frequency energy is to be adjusted between main and side lobes of the beam based on the beamforming parameters.

19. The non-transitory readable storage medium of claim 17, wherein the instructions, when executed, further cause the machine to:

identify a unique identifier of the VR receiving device; and associate the beamforming parameters with the VR receiving device based on the unique identifier.

20. The non-transitory computer readable storage medium of claim 17, wherein a width of the beam is to be adjusted based on the error correction.

21. The non-transitory computer readable storage medium of claim 17, wherein the beamforming parameters are to be forwarded to the wireless system from a virtual reality system.

22. The non-transitory computer readable storage medium of claim 17, wherein the future position of the VR receiving device corresponds to a time period subsequent to a next time period.

23. The non-transitory computer readable storage medium claim 17, wherein the future position of the VR receiving device includes a plurality of future positions of the VR receiving device during a corresponding plurality of future time periods.

24. The apparatus of claim 1, wherein the running error computer is to determine that the error correction includes a beam narrowing correction in response to the running error margin being greater than a first threshold of the threshold error margin range, the beam former to forward a beam narrowing correction parameter corresponding to the beam narrowing correction to the wireless system.

25. The apparatus of claim 24, wherein the running error computer is to determine that the error correction includes a beam widening correction in response to the running error margin being less than a second threshold of the threshold error margin range, the beam former to forward a beam widening correction parameter corresponding to the beam widening correction to the wireless system.

26. The apparatus of claim 25, wherein the first threshold is greater than the second threshold, and the first and second thresholds represent respective measures of confidence associated with the previously-determined tracked position data matching the previously-determined future position data.

* * * * *

UNITED STATES PATENT AND TRADEMARK OFFICE
CERTIFICATE OF CORRECTION

PATENT NO. : 10,644,397 B2
APPLICATION NO. : 15/639910
DATED : May 5, 2020
INVENTOR(S) : Kim Pallister, Karthik Veeramani and Vijay Sarathi Kesavan Page 1 of 1

It is certified that error appears in the above-identified patent and that said Letters Patent is hereby corrected as shown below:

In the Claims

Column 15, Claim 1, Line 47, replace "in response determining" with --in response to determining--

Column 17, Claim 17, Line 13, replace "data" with --data;--

Column 17, Claim 19, Line 30, replace "non-transitory readable" with --non-transitory computer readable--

Column 18, Claim 23, Lines 12-13, replace "storage medium claim" with --storage medium of claim--

Signed and Sealed this
Fifteenth Day of September, 2020

Andrei Iancu
*Director of the United States Patent and Trademark Office*